2,870,564

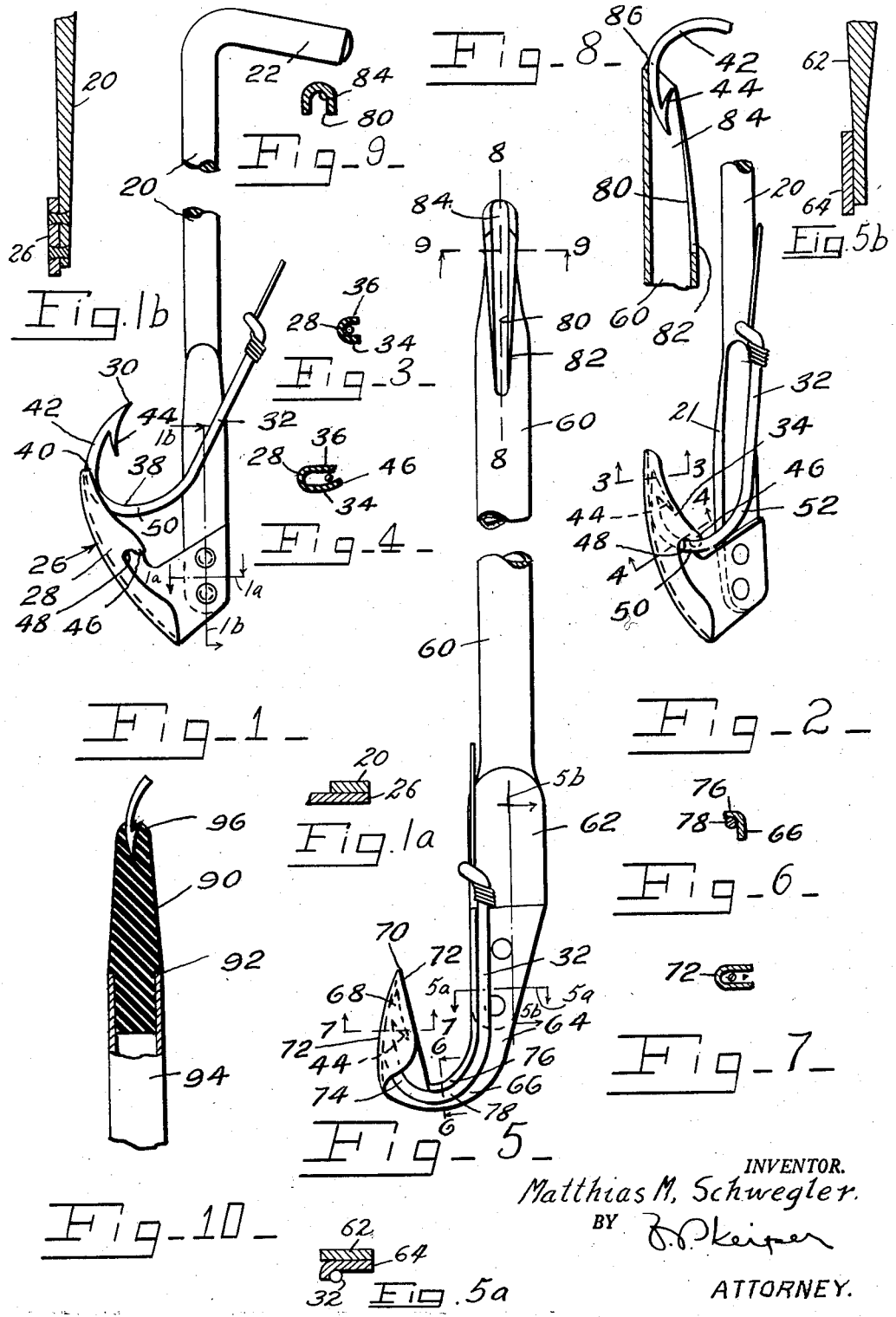

FISH HOOK EXTRACTOR

Matthias M. Schwegler, Syracuse, N. Y.

Application October 19, 1956, Serial No. 617,188

18 Claims. (Cl. 43—53.5)

This invention relates to fish hook extractors and more particularly to an extractor adapted to disengage a barbed hook.

Anglers are continually confronted with the problem of disengaging barbed hooks from fish that have swallowed a hook to such an extent that removal generally results in so injuring the fish that it dies. Where certain fish are in season and others out of season, and an out of season catch is made, it is desirable, so far as possible, to remove the hook in such a manner as not to permanently injure the fish. In practice, this is often impossible and the out of season catch is so injured in removing the hook that it is left to die.

The present invention relates to a barbed hook extractor which is adapted to be inserted along the barbed end of the hook, the same being adapted to follow the hook end into the puncture made by the hook and when properly positioned to enshroud the hook barb so that the hook may be extracted together with the extractor. More particularly, the invention comprises a hook shaped instrument having a tapered pointed channel member which is adapted to ride along and closely conform to the curvature of the hook end leading to the barbed point, the sharpened end being adapted to enter the puncture produced by the hook. The channel section of the extractor is so shaped so that when the extractor is properly positioned, it enshrouds the barb so that the barb becomes disentangled. Provision is also made for coupling the hook to the extractor so that the two may be withdrawn together, although in practice merely enshrouding the barb is often sufficient to release the hook for ready removal.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevational view of the extractor shown in position to follow along the barbed end of a hook;

Figure 2 is a side, slightly turned from Figure 1, elevational view of the extractor in enshrouding relation to the hook and coupled to the hook curvature preparatory for hook extraction;

Figure 3 is a sectional view through the hook taken substantially on line 3—3 of Figure 2;

Figure 4 is a sectional view taken substantially on the line 4—4 of Figure 2;

Figure 5 is an elevational view of a modified form of extractor operating substantially on the principle of the form of Figures 1-4;

Figure 6 is a sectional view taken substantially on the line 6—6 of Figure 5;

Figure 7 is a sectional view taken substantially on the line 7—7 of Figure 5;

Figure 8 is a longitudinal sectional view taken on the line 8—8 of Figure 5;

Figure 9 is a transverse sectional view taken on the line 9—9 of Figure 5; and

Figure 10 is a fragmentary sectional view of a modified form of the handle end of extractor of Figure 5.

In Figures 1-4 there is shown an elongated handle 20 having one end bent as at 22 for convenience. The other end of the handle is a flattened end 21, secured as by rivets or other suitable means to a laterally extending portion of a hook shroud member 26. Such member is provided with a curved channel section 28 which is adapted to extend upwardly and angularly or parallel with respect to the handle 20. The channel member, at its tip end, is spaced from the handle 20 by the approximate distance between the barb point 30 of a fish hook and the shank end 32 thereof.

The channel section 28 is of curved cross section having side flanges 34 and 36, the curvature being sufficient to loosely but closely fit about the circular cross section of the wire 38 of which the hook is formed. The channel section adjacent the upper end tapers to a shallow depth and the tip end 40 is slightly sharpened transversely so as to readily ride along the back edge 42 of the hook for insertion into the puncture made by the hook. The channel section increases in depth as indicated in Figure 4 and as also indicated in Figure 2, to such an extent as to cover the barb 44 of the hook when the hook is positioned in respect to the extractor for extraction, as is indicated in Figure 2.

One of the channel flanges 34 may be provided with a finger 46 which is formed to extend part way over the channel groove as is indicated in Figure 4 and such finger extends downwardly or rearwardly away from the sharpened end, as shown in Figures 1 and 2, so as to provide a recess 48 adapted to readily engage the curved portion 50 of the hook when the channel member is moved along the hook sufficiently to enshroud the barb of the hook. When the extractor is moved along the barb of the hook to such an extent as to allow the finger 46 to clear the inside curvature 52 of the hook, the extractor is moved slightly away from the point of the hook and twisted slightly relative to the hook so that the finger overlies the hook curvature 52, thereby rendering it possible, by manipulation of the extractor, to withdraw the hook from the puncture with the barb of the hook enshrouded by the side walls 34 and 36 of the channel.

In the form shown in Figure 5 the handle 60 may be of tubular construction flattened as at 62 for attachment to the lateral extension of the hook enshrouding element 64 of the extractor. Such hook enshrouding element extends downwardly from the end of the handle 60 and is curved as at 66 and provided with an upwardly extending tapered open channel section 68 which is pointed as at 70. The channel section, as is indicated in Figure 7, is of such a taper and depth as to enshroud the barb 44 of the hook when positioned as shown in Figure 5.

It will be appreciated that the extractor of Figure 5 is operated in approximately the same manner as that of the form of Figure 1 in that the channel end 72 is caused to follow along the curvature of the hook leading to the barbed point as indicated at 74 until the end of the hook and its barb are enshrouded in the tapered channel portion of the extractor.

The curved portion 66 of the extractor is provided with a rounded flange 76 which may engage the inside curvature 78 of the portion of the hook leading to the shank, when positioned as shown in Figure 5, so that thereafter by manipulation of the extractor, the hook may be removed from the puncture with the extractor as one, by suitable manipulation.

It will be seen that the curved flange 76 is of sufficient height and suitably curved in cross-section so as to engage the curvature of the adjacent portion of the hook, when the hook lies against the flat web portion 67. When the extractor is moved along the hook portion 74, the web is spaced angularly from the hook, so the flange may pass over the curved portion of the hook, until the position shown in Figure 5 is reached, whereupon by slight twisting of the extractor, the hook curvature is caused to lie beneath the flange, for removal of the hook and extractor together.

The depth of the channel of Figure 1 is curved lengthwise to render the channel concave lengthwise thereof along its inside bottom face, so as to conform to the slight curvature of the barbed end of the hook and adajacent shank, and the channel of Figure 5 may be similarly formed if desired. Such channel in both forms extends to the sharpened end, to facilitate centering the channel on the hook shank whereby to assist in guiding the channel along the hook.

The end of the hollow tubular handle 60 as shown in Figures 8 and 9 may be cut on a slant as is indicated at 80 and flattened and slotted as at 82 to provide in effect a channel 84 somewhat similar to that shown in Figure 1, the channel tapering in depth. The end edge is sharpened as at 86. The handle end as thus formed may be slid down from the point end of the hook into the puncture of the flesh of the fish and enshroud the barb, so as to release the barb, and protect the same from ensnaring the flesh of the fish during withdrawal. The handle channel thus becomes useful, since it permits operating on the hook, under such circumstances as would render the channel member at the other end from being used, by reason of the angular relation of such channel member in respect to the handle.

In Figure 10, the hollow handle is provided with a rubber tip 90 shouldered as at 92, for insertion into the handle end indicated at 94. The rubber tip will be made of relatively soft rubber so that the tip end thereof as at 96 may be pushed on to the end of the hook to a sufficient distance to cover the barb as is indicated in Figure 10. The handle may then be employed to drive the hook back into the puncture so as to position the hook for more ready extraction by use of the other end of the extractor in the manner described or for ready removal without further operation.

While several forms of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A barbed hook extractor comprising a flattened U-channel section member tapering in depth, said channel section member being transversely sharpened at its end of lesser cross-section along its inside edge, said member being of a depth and cross section to closely and substantially enshroud the barb point and sides of the barb of a barbed hook when nested in said channel section.

2. A barbed hook extractor comprising a flattened U-channel section member tapering in depth, said channel section member being transversely sharpened at its end of lesser cross-section along its inside edge, said member being of a depth and cross section to closely and substantially enshroud the barb point and sides of the barb of a barbed hook when nested in said channel section with the point of the hook adjacent the sharpened end of the member and means on said member for releasably engaging the hook rearwardly of the barb.

3. A barbed hook extractor comprising a channel section member tapering in depth, said channel section member being transversely sharpened at its end of lesser cross-section, said member being of a depth and cross cross-section to closely and substantially enshroud the barb point and sides of the barb of a barbed hook when nested in said channel section with the point of the hook adjacent the sharpened end of the member, and means comprising a finger formed on one side wall of said channel member adjacent its cross section of greater depth, said finger extending part way across said open channel, and rearwardly from said sharpened end.

4. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section and means on said member extending from one wall of the channel member part way across said channel adjacent the end thereof of greater depth, for engaging a portion of the shank of a barbed hook having its barb enshrouded in said channel.

5. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, the channel portion of said member being curved lengthwise to render the inside face of said channel concave lengthwise thereof.

6. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section with the point of the hook adjacent the sharpened end of the member and means on said member for releasably engaging the hook rearwardly of the barb, the channel portion of said member being curved lengthwise to render the inside face of said channel concave lengthwise thereof.

7. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section with the point of the hook adjacent the sharpened end of the member, and means comprising a finger formed on one side wall of said channel member adjacent its cross section of greater depth, said finger extending part way across said open channel, and rearwardly from said sharpened end, the channel portion of said member being curved lengthwise to render the inside face of said channel concave lengthwise thereof.

8. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section and means on said member extending from one wall of the channel member part way across said channel adjacent the end thereof of greater depth, for engaging a portion of the shank of a barbed hook having its barb enshrouded in said channel, the channel portion of said member being curved lengthwise to render the inside face of said channel concave lengthwise thereof.

9. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, said member having a lateral extension beyond the end of the channel member formed as an extension of one side wall of said channel, and an elongated handle affixed at one end to said extension and extending in the general direction of the sharpened end of said member.

10. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section with the point of the hook adjacent the sharpened end of the member, means on said member for releasably engaging the hook rearwardly of the barb, said member having a lateral extension beyond the end of the channel member formed as an extension of one side wall of said channel, and an elongated handle affixed at one end to said extension and extending in the general direction of the sharpened end of said member.

11. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section with the point of the hook adjacent the sharpened end of the member, means comprising a finger formed on one side wall of said channel member adjacent its cross section of greater depth, said finger extending part way across said open channel, and rearwardly from said sharpened end, said member having a lateral extension beyond the end of the channel member formed as an extension of one side wall of said channel, and an elongated handle affixed at one end to said extension and extending in the general direction of the sharpened end of said member.

12. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, means on said member extending from one wall of the channel member part way across said channel adjacent the end thereof of greater depth, for engaging a portion of the shank of a barbed hook having its barb enshrouded in said channel, said member having a lateral extension beyond the end of the channel member formed as an extension of one side wall of said channel, and an elongated handle affixed at one end to said extension and extending in the general direction of the sharpened end of said member.

13. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, the channel portion of said member being curved lengthwise to render the inside face of said channel concave lengthwise thereof, said member having a lateral extension beyond the end of the channel member formed as an extension of one side wall of said channel, and an elongated handle affixed at one end to said extension and extending in the general direction of the sharpened end of said member.

14. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section with the point of the hook adjacent the sharpened end of the member, means on said member for releasably engaging the hook rearwardly of the barb, the channel portion of said member being curved lengthwise to render the inside face of said channel concave lengthwise thereof, said member having a lateral extension beyond the end of the channel member formed as an extension of one side wall of said channel, and an elongated handle affixed at one end to said extension and extending in the general direction of the sharpened end of said member.

15. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section with the point of the hook adjacent the sharpened end of the member, means comprising a finger formed on one side wall of said channel member adjacent its cross section of greater depth, said finger extending part way across said open channel, and rearwardly from said sharpened end, the channel portion of said member being curved lengthwise to render the inside face of said channel concave lengthwise thereof, said member having a lateral extension beyond the end of the channel member formed as an extension of one side wall of said channel, and an elongated handle affixed at one end to said extension and extending in the general direction of the sharpened end of said member.

16. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, means on said member extending from one wall of the channel member part way across said channel adjacent the end thereof of greater depth, for engaging a portion of the shank of a barbed hook having its barb enshrouded in said channel, the channel portion of said member being curved lengthwise to render the inside face of said channel concave lengthwise thereof, said member having a lateral extension beyond the end of the channel member formed as an extension of one side wall of said channel, and an elongated handle affixed at one end to said extension and extending in the general direction of the sharpened end of said member.

17. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, said member having a lateral extension beyond the end of the channel member formed as an extension of one side wall of said channel, and an elongated handle affixed at one end to said extension and extending in the general direction of the sharpened end of said member, said handle being tubular at its other end and having means for covering the barbed end of a hook.

18. A barbed hook extractor comprising a channel section member tapering in depth, said channel section member being transversely sharpened at its end of lesser cross-section, said member being of a depth and cross section to closely and substantially enshroud the barb point and sides of the barb of a barbed hook when nested in said channel section, said member having a lateral extension beyond the end of the channel member formed as an extension of one side wall of said channel, and an elongated handle affixed at one end to said extension and extending in the general direction of the sharpened end of said member, said handle being tubular at its other end, and being flattened and slitted lengthwise and formed to provide a tapered channel for receiving and covering the barbed end of a hook.

References Cited in the file of this patent
UNITED STATES PATENTS 2,493,142   Hutton _____ Jan. 3, 1950